(12) United States Patent
Weiβ et al.

(10) Patent No.: US 7,696,282 B2
(45) Date of Patent: Apr. 13, 2010

(54) METHOD FOR THE HYDROGENATION OF UNSATURATED POLYMERS CONTAINING DOUBLE BONDS

(75) Inventors: Thomas Weiβ, Mannheim (DE); Karin Creutz, Langenfeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 517 days.

(21) Appl. No.: 10/586,016

(22) PCT Filed: Jan. 7, 2005

(86) PCT No.: PCT/EP2005/000075

§ 371 (c)(1),
(2), (4) Date: Jul. 14, 2006

(87) PCT Pub. No.: WO2005/068512

PCT Pub. Date: Jul. 28, 2005

(65) Prior Publication Data

US 2008/0234437 A1 Sep. 25, 2008

(30) Foreign Application Priority Data

Jan. 17, 2004 (DE) .................... 10 2004 002 576

(51) Int. Cl.
*C08F 8/04* (2006.01)
(52) U.S. Cl. .............. 525/338; 525/339; 525/337; 525/376; 525/371; 525/386; 524/543; 524/571; 585/250; 585/275; 585/276; 585/277
(58) Field of Classification Search ............ 525/338, 525/339; 524/543, 571–587; 585/277
See application file for complete search history.

(56) References Cited

U.S. PATENT DOCUMENTS 4,801,643 A * 1/1989 Craig .................... 524/832
4,994,528 A * 2/1991 Abraham et al. ............ 525/338
5,470,906 A * 11/1995 Craun et al. ............... 524/507
6,084,033 A   7/2000 Hsu et al. ................. 525/338
6,224,739 B1 * 5/2001 Reetz et al. ................ 205/464
2004/0242800 A1* 12/2004 Takahashi et al. .......... 525/338

FOREIGN PATENT DOCUMENTS

| EP | 1 454 924 | 9/2004 |
| JP | 58 005304 | 1/1983 |
| JP | 06 287219 | 10/1994 |
| WO | 00/09576 | 2/2000 |
| WO | 01/55223 | 8/2001 |
| WO | WO/03/029307 | * 4/2003 |

OTHER PUBLICATIONS

Mayer Andrea B R et al: "Platinum nanocatalysts immobilized on latex supports" J Polym Sci Part B; Journal of Polymer Science, Part B: Polymer Physics Jun. 1997 John Wiley & Sons Inc. New York, NY, USA, vol. 35, No. 8, Jun. 1997, pp. 1207-1216, XP002327349 the whole document.

Nakao, Yukimichi et al: "Colloidal nickel boride catalyst for hydrogenation of olefins" Journal of Catalysis, 68(2), 406-10 CODEN: JCTLA5, ISSN: 0021-9517, 1981, XP009047382 the whole document.

China Synthetic Rubber Industry, 2002, 25 (5), 311 Yao Ming et al.; "Hydrogenation of NBR latex catalyzed by Rh-Ru bimetallic complex".

Rubber Chemistry and Technology, 1995, 68(2), 281; Nikhil K. Singha and s. Sivaram; "A New Method to Hydrogenate Nitrile Rubber in the Latex Form".

* cited by examiner

*Primary Examiner*—Vasu Jagannathan
*Assistant Examiner*—Robert C Boyle
(74) *Attorney, Agent, or Firm*—Jennifer R. Seng

(57) ABSTRACT

The present invention relates to a method for the hydrogenation of unsaturated polymers containing double bonds, the unsaturated polymers present in latex form being hydrogenated in the presence of a metal-containing colloid.

8 Claims, No Drawings

METHOD FOR THE HYDROGENATION OF UNSATURATED POLYMERS CONTAINING DOUBLE BONDS

The present invention relates to a method for the hydrogenation of unsaturated polymers containing double bonds, the unsaturated polymers present in latex form being hydrogenated in the presence of a metal-containing colloid.

The hydrogenation of unsaturated polymers, for example of unsaturated elastomers, such as acrylonitrile/butadiene copolymers (NBR), to give corresponding completely or partly hydrogenated polymers is known.

For example, copolymers of butadiene and acrylonitrile are hydrogenated in industrial processes to give corresponding hydrogenated products, the resulting partly or completely hydrogenated copolymers based on butadiene and acrylonitrile having improved resistance to aging, ozone resistance and low swellability.

A variant of the commercial hydrogenation of unsaturated polymers, such as NBR, consists in coagulating the NBR latex obtained, for example, by emulsion polymerization and separating it from the serum. Thereafter, the NBR rubber is dried in a plurality of process steps, dissolved in an organic solvent and (partly) hydrogenated with the aid of homogeneous or heterogeneous hydrogenation catalysts. For example, Wilkinson catalysts based on ruthenium or rhodium, by means of which a homogenous catalysis is carried out, or heterogeneous catalysts, for example based on palladium/carbon, are suitable.

However, the procedure has the disadvantage that the unsaturated rubber obtained has to be dissolved again in an organic solvent in a separate process step so that the hydrogenation can be carried out subsequently.

Another variant of the hydrogenation of unsaturated polymers, e.g. elastomers, consists in directly hydrogenating the unsaturated polymer in latex form without first isolating the parent rubber and dissolving it again in an organic solvent for the hydrogenation.

This procedure is described, for example, in WO 00/09576 and WO 01/55223. However, a disadvantage of this procedure is that the hydrogenation is carried out in the presence of hydrazine or hydrazine-donating compounds and in the presence of an oxidizing agent, such as hydrogen peroxide, and in the presence of certain additives. Since working with hydrazine in the presence of an oxidizing agent requires certain safety precautions, the hydrogenation reaction described is associated with relatively expensive apparatus, which adversely affects the cost-efficiency. Moreover, the hydrogenation requires hydrazine and an oxidizing agent. Gel formation occurs in this reaction. In order to avoid or reduce the gel formation, however, additional process measures are required, which likewise adversely affects the cost-efficiency.

It is furthermore known that unsaturated polymers in latex form can be hydrogenated in the presence of a water-soluble Wilkinson catalyst. This method too has the disadvantage that certain gel formation of the hydrogenated polymer obtained occurs, which leads to a lower quality of the hydrogenated product (cf. for example *Synthetic Rubber Industry*, 2002, 25 (5), 311; *Rubber Chemistry and Technology*, 1995, 68(2), 281 and U.S. Pat. No. 6,084,033).

It is therefore an object of the present invention to provide an economical method for the hydrogenation of unsaturated polymers which can be carried out in a technically simple manner, in combination with a good product quality of the hydrogenated or partly hydrogenated polymer.

The present invention relates to a method for the hydrogenation of unsaturated polymers containing double bonds, which is characterized in that a metal-containing colloid is first prepared under reducing conditions in the presence of an unsaturated polymer present in latex form, the colloid-containing latex mixture obtained is then hydrogenated, the metal-containing colloid is then separated from the latex and the polymer latex obtained is isolated.

Suitable unsaturated polymers containing double bonds which can be hydrogenated by the method according to the invention are, for example, those which are composed of conjugated dienes (homopolymers) or are composed of from 1 to 5% by weight of conjugated dienes and from 95 to 99% by weight of unsaturated monomers containing vinyl groups (copolymers). The following are mentioned as examples of conjugated dienes: 1,3-butadiene, 2,3-dimethylbutadiene, isoprene and 1,3-pentadiene. Specific examples of unsaturated monomers containing vinyl groups are, for example, nitrile compounds, such as acrylonitrile and methacrylonitrile, aromatic compounds containing vinyl groups, such as styrene, o-, m- and p-alkylstyrenes, such as methylstyrenes, and divinylbenzene. In addition, aromatic dialkenyl compounds, such as diisopropenylbenzene, unsaturated carboxylic acid and carboxylic esters, such as acrylic acid, methacrylic acid, crotonic acid, maleic acid, methyl acrylate, ethyl acrylate, butyl actrylate, 2-ethylhexyl acrylate and methyl methacrylate, vinylpyridine and vinyl esters, such as vinyl acetate, may be mentioned.

Unsaturated polymers which may be mentioned as being preferred are polybutadiene, polyisoprene, styrene/butadiene copolymers (SBR), acrylonitrile/butadiene copolymers (NBR), natural rubber, butadiene/isoprene rubber and terpolymers of butadiene, acrylonitrile and butyl acrylate or acrylic acid. Acrylonitrile/butadiene copolymers (NBR) are very particularly preferred.

As mentioned, the unsaturated polymers are hydrogenated in latex form. The preparation of corresponding latices of the abovementioned unsaturated polymers is generally known to the person skilled in the art. The latex form of the corresponding unsaturated polymer is an aqueous emulsion of the polymer, which emulsion may contain the known latex additives, such as emulsifiers and stabilizers, in the known and customary amounts. The preparation of a corresponding polymer latex, for example of an NBR latex, is described, for example, in general form in *Rubber Chem. Technol.* 1963, 36, 1 by W. Hoffmann and in literature references cited there.

In the method according to the invention, the concentration of the polymer latex to be hydrogenated is from about 1 to 50% by weight, preferably from 10 to 30% by weight, based on the aqueous emulsion.

As described above, it is important for the method according to the invention that a metal-containing colloid is prepared in the presence of an unsaturated polymer present in latex form and the colloid-containing latex mixture obtained is then hydrogenated.

In the relevant procedure, a metal salt or a metal complex is reductively converted into a metal-containing colloid in the presence of the polymer latex, optionally with the concomitant use of surface-active substances, such as surfactants, or with the use of colloid-stabilized substances, such as polyvinylpyrrolidone.

For example, amphiphilic betaines (A), such as 3-N,N (dimethyldodecylamino)-propane sulfonate, cationic surfactants (B), fatty alcohol polyglycol ethers (C), polyoxyethylene carbohydrate fatty alkyl esters (D), anionic surfactants (E), such as arylalkanesulfonic acids or alkanesulfonic acids and sodium salts thereof, and long-chain alkyl sulfates, such as sodium dodecylsulfate and alkali metal salts of saturated and unsaturated fatty acids, but also amphiphilic sugar surfactants (F), may be mentioned as surfactants to be used.

The colloid-stabilized substances or the surfactants can be used in amounts from about 1 to 10% by weight, based on the solid rubber, it also being possible to use surfactant mixtures.

An advantageous variant consists in first dissolving the metal salt or the metal complex in water and introducing the aqueous solution into the existing latex of the unsaturated polymer with the use of corresponding surface-active substances or colloid-stabilizing substances and then adding a reducing agent. The introduction of the aqueous solution of the metal salt or metal complex into the latex is usually effected at temperatures of from about 20 to 70° C., preferably at from 20 to 30° C.

In order to avoid coagulation of the latex during the preparation of the metal-containing colloid, it is important to work in a certain pH range. A pH range of from about 3 to 6, preferably from 4.5 to 5, is advantageous.

Metal salts or metal complexes which may be used are those which are based on metals of group VIIIB of the Periodic Table of the Elements and also on metals such as ruthenium or rhodium. The metal salts or the metal complexes can also be used as a mixture with one another.

The metal salts used can be represented by the following general formula:

$$M^{n+}(A)_m,$$

in which
M are metals of subgroup group VIIIB (according to Medeleev), in particular the metals of group 10 (IUPAC) and rhodium and ruthenium. Ni, Pd, Rh and Ru are particularly preferred and Ni is very particularly preferred,
A is an organic or inorganic anion, in particular from the group R—COO⁻ where R=hydrogen, methyl, ethyl, propyl, halogens, such as F, Cl, Br, I, complex anions, such as $NO_3^-$, $SO_4^{2-}$, $ClO_4^-$, $BF_4^-$, $PF_6^-$, $CN^-$ and
m, n as variables are selected so that, taking into account the ionic charges, a neutral compound forms.

The metal-containing alkali metal salts or acids contain complex anions corresponding to the formula $$[M^{n+}(A)_m]^{k-},$$

in which
M are metals of the subgroup group VIIIB, in particular the metals of group 10 and rhodium and ruthenium. Ni, Pd, Pt, Rh and Ru are very particularly preferred, in particular Ni,
A is an organic or inorganic anion, in particular from the group R—COO⁻ where R=hydrogen, methyl, ethyl, propyl, halogens, such as F, Cl, Br, I, complex anions, such as $NO_3^-$, $SO_4^{2-}$, $ClO_4^-$, $BF_4^-$, $PF_6^-$, $CN^-$ and
m, n, k as variables are selected so that, taking into account the ionic charges, metal-containing complex anions form.

Further neutral donors, such as water of hydration, may also optionally be present in the metal-containing salts.

The following metal salts and metal complexes may be mentioned as particularly preferred: cobalt chloride, cobalt nitrate, cobalt bromide, cobalt perchlorate, cobalt carboxylates, cobalt formate, cobalt dioctanoate, cobalt sulfate, cobalt alkanesulfonates, hexamminecobalt dichloride, nickel chloride, nickel nitrate, nickel bromide, nickel perchlorate, nickel carboxylates, nickel formate, nickel dioctanoate nickel sulfate, nickel alkanesulfonates, hexamminenickel dichloride, rhodium tribromide, rhodium trichloride, chloropentamminerhodium chloride, ruthenium tribromide, ruthenium trichloride, hexammineruthenium(II) chloride, hexammineruthenium(III) chloride, chloropentammineruthenium (III) chloride, palladium dichloride, hexachloropalladic acid, hexachloroplatinic acid, sodium hexachloropalladate, sodium hexachloroplatinate, sodium tetrachloropalladate, sodium tetrachloroplatinate, tetrammineplatinum tetrachloroplatinate, tetramminepalladium tetrachloropalladate, very particularly preferably hexachloroplatinic acid, hexachloropalladic acid, sodium tetrachloroplatinate, sodium tetrachloropalladate, palladium dichloride, nickel chloride. The metal salts and metal complexes can be used both individually and in any desired mixture with one another.

Usually, the metal salts or metal complexes are used in amounts of from about 0.01 g to 5 g, preferably from 0.1 to 1.0 g, based on 5 g of solid rubber.

In the method according to the invention, the metal salts or metal complexes used are reductively converted into a metal-containing colloid at temperatures in the range from about 20 to 100° C., preferably from 20 to 70° C., in the presence of the existing polymer latex.

Suitable reducing agents are, for example, hydrogen, complex hydrides, in particular sodium hydride, reductive inorganic compounds, such as hydrazine and hydrazine hydrates, hydroxylamines and salts thereof, but in particular hydrazine and its salts. In addition, organic compounds, such as aldehydes and/or alcohols, preferably acetaldehyde, formaldehyde, ethyl alcohol and/or methyl alcohol, can be used as reducing agents. However, alkali metal formates may also be mentioned. In addition, finely divided, nonnoble metals, such as zinc powder, can effect the reduction of the nobler metals to give stable colloids in the presence of colloid-stabilizing substances. The colloid-stabilizing substances, for example polyvinylpyrrolidine or poly(N-vinylpyrrolidone-co-2-dimethylaminoethyl methacrylate), are themselves also considered to be reducing agents.

The following may be mentioned as particularly preferred reducing agents: hydrogen, complex hydrides, such as $NaBH_4$, hydroxylammonium hydrochloride, hydrazine and hydrazine hydrate, formaldehyde and acetaldehyde, formic acid and sodium formate, zinc powder, in particular hydrogen, sodium borohydride and hydrazine hydrate. The reducing agent can also be used in any desired mixtures with one another.

It is also possible to effect the addition of the reducing agent in the presence of a hydrogen atmosphere already present.

After an appropriate mixture of polymer latex and metal-containing colloid has been prepared, the hydrogenation of the unsaturated polymer is effected. The hydrogenation is carried out at hydrogen pressures in the range from about 0.1 to 100 bar, preferably from 1 to 50 bar, very particularly preferably at from 1 to 15 bar. The hydrogenation temperatures are usually in the range from about 25 to 100° C., preferably from 25 to 70° C.

After the hydrogenation is complete, the metal is removed from the reaction mixture. This is effected by cooling the reaction mixture to about 20 to 30° C. by addition of a complexing agent under oxidative conditions and subsequent coagulation of the latex. The metal remains as metal salt in the serum.

Particularly suitable complexing agents are those substances which promote the oxidation of the low-valency metal particularly effectively by strong complex formation with the resulting metal ion. Particularly effective are the oxidation-promoting water-soluble complexing agents, such as polybasic hydroxycarboxylic acids, phosphoric acids or amines or mixtures of said complexing agents. The complexing agents are usually used in amounts of from about 0.01 g to 5 g, preferably from 0.1 to 1.0 g based on 5 g of solid rubber.

Preferably used complexing agents are: EDTA alkali metal salts, lactic acid, sugar acids, such as, for example, glucuronic acid, citric acid, tartaric acid, ascorbic acid, phosphoric acid, or complexing anions, such as SCN⁻, CN⁻, F⁻, individually or in any desired mixtures with one another.

Suitable oxidizing agents are preferably gaseous oxidizing agents, in particular (atmospheric) oxygen. Of course, it is also possible to use other oxidizing agents if they do not change or damage the polymer latex present. For example, dilute nitric acid can also be used as oxidizing agent.

In addition to chemical isolation physical methods are also conceivable for separating the metal from the polymer latex. Electrochemical methods and the use of centrifuging for separating the metal colloid having a higher density from the polymer latex may be mentioned. Particularly suitable are all methods which are capable of transferring the metal-containing colloid into the aqueous phase, for example by water-soluble complexing agents or by selective adsorbents, such as sulfonated triphenylphosphines, crown ethers and/or ion exchange resins.

After the removal of the metal from the hydrogenated polymer latex, the latex of the hydrogenated product is isolated in a customary manner, such as, for example, by coagulation by means of ethanol addition, addition of magnesium salts or by cooling.

Of course, it is also possible to precipitate the latex in a known manner and to separate the precipitated polymer from the aqueous phase by, for example, filtration.

Hydrogenated or partly hydrogenated polymers are obtained by the method according to the invention, from about 1 to 99%, preferably from 10 to 60%, of the originally present double bonds being hydrogenated. The degree of hydrogenation is therefore from about 1 to 99% of theory, preferably from 10 to 60%.

EXAMPLES

Example 1.1

Preparation of a Nickel Colloid in the Presence of NBR Latex (pH5)

$NiCl_2.6H_2O$ (0.126 g, 0.53 mmol) was dissolved with the alkylsulfonate Mersolat® 30 (0.36 g) in 10 ml of oxygen-free water laden with argon (10 ml). Poly(N-vinylpyrrolidone-co-2-dimethylaminoehtyl methacrylate) was then added as a solution (0.5 g; 19% by weight in water). This mixture was mixed dropwise with stirring with the latex (20 ml, 19.27% by weight of Perbunan® NT 3445 VP, AN content 24% by weight, pH 5 (HCl), about 5% by weight of Mersolat, based on solid rubber. The $NaBH_4$ solution (0.12 g in 5 ml of water) was then added dropwise. During the reaction, elemental nickel formed immediately and strong foaming was observable. (This can be reduced by prior addition of silicone oil (2 drops) to the latex.) After about 1 h the total amount of $NaBH_4$ had been added and a gray-black latex was obtained, which was used immediately for the hydrogenation.

Example 1.2 (Comparison)

Preparation of a Nickel Colloid in the Presence of NBR Latex (pH 14)

$NiCl_2.6H_2O$ (0.126 g, 0.53 mmol) was dissolved with the alkane sulfonate Mersolat® 30 (0.36 g) in 10 ml of oxygen-free water laden with argon (10 ml). Poly( N-vinylpyrrolidone-co-2-dimethylaminoehtyl methacrylate) was then added as a solution (0.5 g; 19% by weight in water). This mixture was added dropwise with stirring to a mixture of $NaBH_4$ solution (0.12 g in 5 ml of water) with the latex (20 ml, 19.27% by weight of Perbunan® NT 3445 VP, AN content 24% by weight, pH 12, about 1% by weight of Mersolat based on solid rubber). During the reaction, elemental nickel formed immediately and strong foaming was observable. (This can be reduced by prior addition of silicone oil (2 drops) to the latex.) After about 1 h, the total amount of $NiCl_2$ had been added and a gray-black latex was obtained, which was used immediately for the hydrogenation.

Example 2

Carrying Out the Hydrogenation

A heatable 0.3 liter reactor H 5347 of Hastelloy C4, approved to 50 bar (max. operating pressure 300 bar at 300° C.), with a magnet-coupled paddle stirrer was used for this purpose.

The clean reactor was dried in a vacuum for 3 h at 100° C. and cooled, tested for leakage with 20 bar nitrogen and evacuated again.

The prepared latex solution (40 ml) was sucked into the reactor and then heated to the desired temperature with stirring.

On reaching the desired temperature, the reactor was fed with 10 bar hydrogen, which was metered in continuously. Stirring for 3 h at 70° C. (150 rpm), cooling and dilution with 5 bar nitrogen to a total pressure of 15 bar were effected. The pressure was then let down in the course of 0.5 h in a nitrogen stream of 12 m²/h. 3 bar nitrogen was now fed and the pressure was let down. This process was repeated twice and the latex was then removed.

Example 3.1

Removal of the Nickel Colloid From Acidic Polymer Latex and Working-up of the Polymer The oxidation of the elemental nickel in the NBR latex was carried out by addition of citric acid in the presence of atmospheric oxygen. Atmospheric oxygen was added to the latex in the course of 0.5 h at a citric acid concentration of 0.5 g/ml, a white latex being obtained. With the use of a lower citric acid concentration (0.02 g/ml), complete decoloration takes about 6 h. By addition (ethanol/latex=2:1) of ethanol with antiaging agent (0.1 g of BKF® in 100 ml of ethanol) the white latex was caused to coagulate. The rubber was then separated off and washed with water. The polymer was dried in a vacuum drying oven at 50° C. and characterized.

Example 3.2

Removal of the Nickel Colloid From Basic Polymer Latex and Working-up of the Polymer The oxidation of the elemental nickel in the NBR latex was carried out by addition of KCN in the presence of atmospheric oxygen. Atmospheric oxygen was added to the latex in the course of 0.5 h at a KCN concentration of 0.1 g/ml, a white latex being obtained. With the use of a lower KCN concentration (0.02 g/ml), complete decoloration takes about 6 h. By addition (ethanol/latex=2:1) of ethanol with antiaging agent (0.1 g of BKF® in 100 ml of ethanol) the white latex was caused to coagulate. The rubber was then separated off and washed with water. The polymer was dried in a vacuum drying oven at 50° C. and characterized.

TABLE

Hydrogenation of NBR latex with metal-containing colloids.[a]

| No. | Polymer | [M]: (mM) | $T_p$(° C.) | Degree of hydrogenation (mol %) | Soluble fraction (% by wt.) | [η]/(ml/g) | $M_w/10^5$ |
|---|---|---|---|---|---|---|---|
| * | Perbunan ® NT 3445 VP | — | — | — | 99.3 | 146.8 | 1.288 |
| 1 | Perbunan ® NT 3445 VP | [Ni]: 17.7 Example 1.1 | 65 | 12 | 99.2 | 180.6 | 2.111 |
| 2 | Perbunan ® NT 3445 VP | [Ni]: 35.3 Example 1.1 | 65 | 13 | 57.2 | 121.5 | n.a. |
| 3** | Perbunan ® NT 3445 VP | [Ni]: 17.7 Example 1.2 | 65 | 0 | 37.3 | 82.8 | n.a. |
| 4** | Blank test | — | 65 | 0 | 99.5 | 153.0 | |

[a]Conditions: 40 ml, 19.27% by weight of Perbunan ® NT 3445 VP; AN content 24% by weight, pH 5 (HCl) or pH 14, about 5% by weight of Mersolat, based on solid rubber; 20 ml of water; duration of hydrogenation: 3 h; $H_2$: 10 bar; soluble fraction and [η] in THF; degree of hydrogenation from $^1$H-NMR spectra determined in CDCl3 (400 MHz).
* Starting material;
**comparison.

The invention claimed is:

1. A method for the hydrogenation of unsaturated polymers containing double bonds, comprising the steps of: (a) preparing a metal-containing colloid in the presence of an unsaturated polymer present in latex form and a reducing agent selected from the group consisting of hydrogen, complex hydrides, reductive inorganic compounds, organic compounds, alkali metal formates, finely divided non-noble metals and mixtures thereof, whereby the pH during the preparation of the metal-containing colloid is in the range of from 3 to 6, and (b) hydrogenating and hydrogenating the colloid containing latex mixture obtained, and separating the metal containing colloid from the latex, and isolating the polymer latex.

2. The method as claimed in claim 1, characterized in that unsaturated polymers containing double bonds which are used are those which are composed of conjugated dienes or of from 1 to 5% by weight of conjugated dienes and from 95 to 99% by weight of unsaturated monomers containing vinyl groups.

3. The method as claimed in claim 1, characterized in that the concentration of the polymer latex to be hydrogenated is from 1 to 50% by weight, based on the aqueous emulsion.

4. The method as claimed in claim 1, characterized in that metal salts or metal complexes which are based on metals of group VIIIB of the Periodic Table of the Elements (Mendeleev) and of ruthenium or rhodium are used for the preparation of the metal-containing colloid.

5. The method as claimed in claim 1, characterized in that the hydrogenation of the colloid-containing latex mixture is carried out at pressures in the range of from 0.1 to 100 bar and at temperatures in the range of from 25 to 100° C.

6. The method as claimed in claim 1, wherein the reducing agent is selected from the group consisting of hydrogen, NaBH4, hydroxylammonium hydrochloride, hydrazine and hydrazine hydrate, formaldehyde and acetaldehyde, formic acid and sodium formate, zinc powder and mixtures thereof.

7. The method as claimed in claim 1, wherein the reducing agent is selected from the group consisting of hydrogen, sodium borohydride, and hydrazine hydrate and mixtures thereof.

8. The method as claimed in claim 1, wherein the reducing agent is added in the presence of a hydrogen atmosphere.

* * * * *